United States Patent [19]

Ando

[11] Patent Number: 4,668,092

[45] Date of Patent: May 26, 1987

[54] WAVELENGTH DRIVING DEVICE FOR MONOCHROMATORS

[75] Inventor: Osamu Ando, Kyoto, Japan

[73] Assignee: Shimadzu Corporation, Japan

[21] Appl. No.: 801,825

[22] Filed: Nov. 26, 1985

[30] Foreign Application Priority Data

Nov. 30, 1984 [JP] Japan ............................ 59-254739

[51] Int. Cl.$^4$ .............................................. G01J 3/18
[52] U.S. Cl. ..................................... 356/332; 356/334
[58] Field of Search ................. 356/331, 332, 333, 334

[56] References Cited

U.S. PATENT DOCUMENTS 3,144,498  8/1964  Alpert et al. ..................... 356/334
3,733,131  5/1973  Mould ............................... 356/334

Primary Examiner—F. L. Evans

[57] ABSTRACT

A wavelength driving device for use in monochromators which comprises an optical element for dispersing light into different wavelengths, means for supporting the optical element for rotation about a first axis, a stepping motor, a first toothed pulley of a relatively small diameter connected to the output shaft of the stepping motor for simultaneous stepwise rotation therewith, a first gear of a relatively large diameter fixed to the supporting means for simultaneous rotation about the first axis, a second gear of a relatively small diameter mounted for rotation about a second axis and meshing with the first gear, a second toothed pulley of a relatively large diameter fixed to the second gear for simultaneous rotation about the second axis, a toothed belt connecting the first and second toothed pulleys, and circuit means for controlling the rotation of the stepping motor.

10 Claims, 4 Drawing Figures

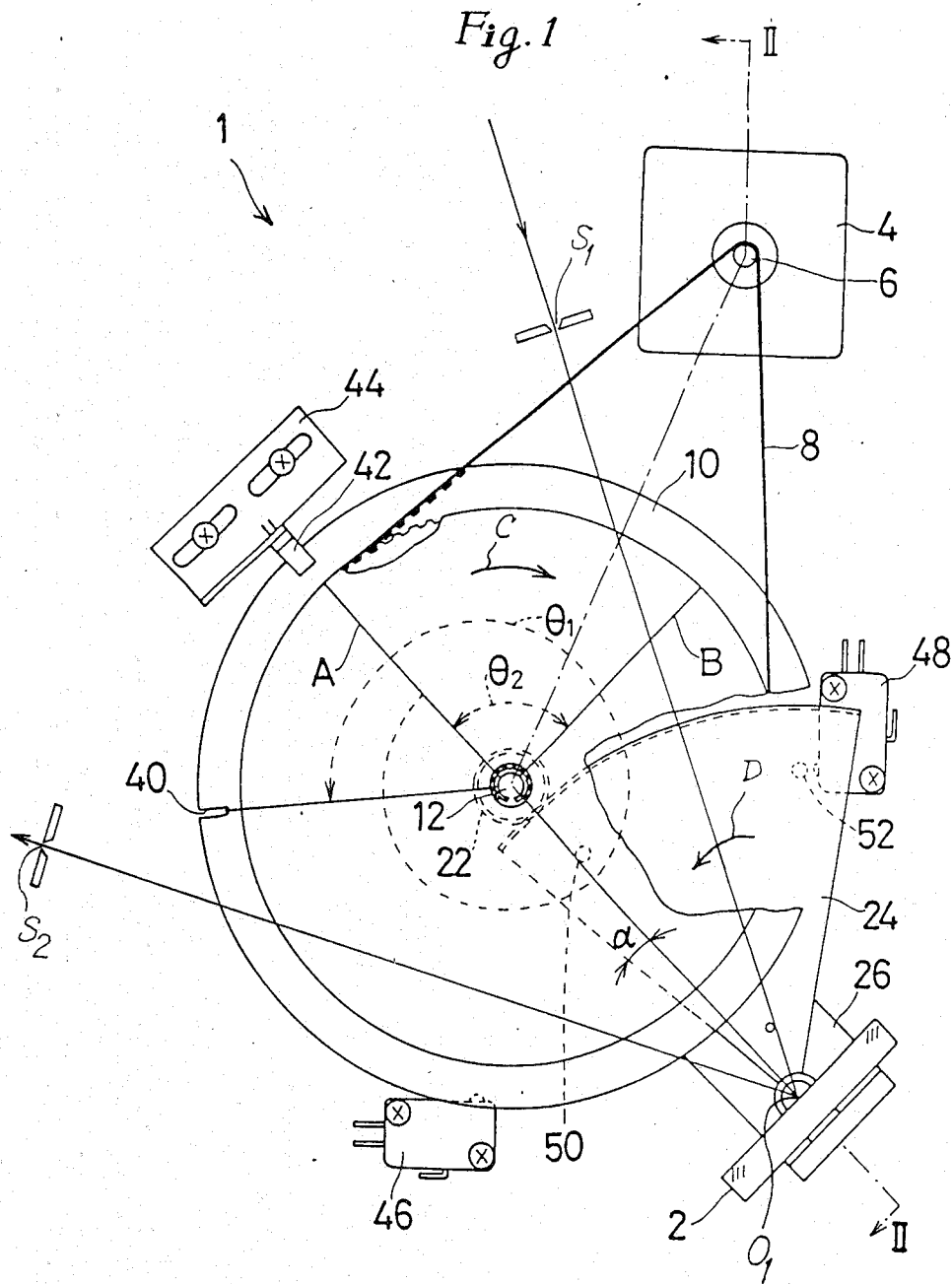

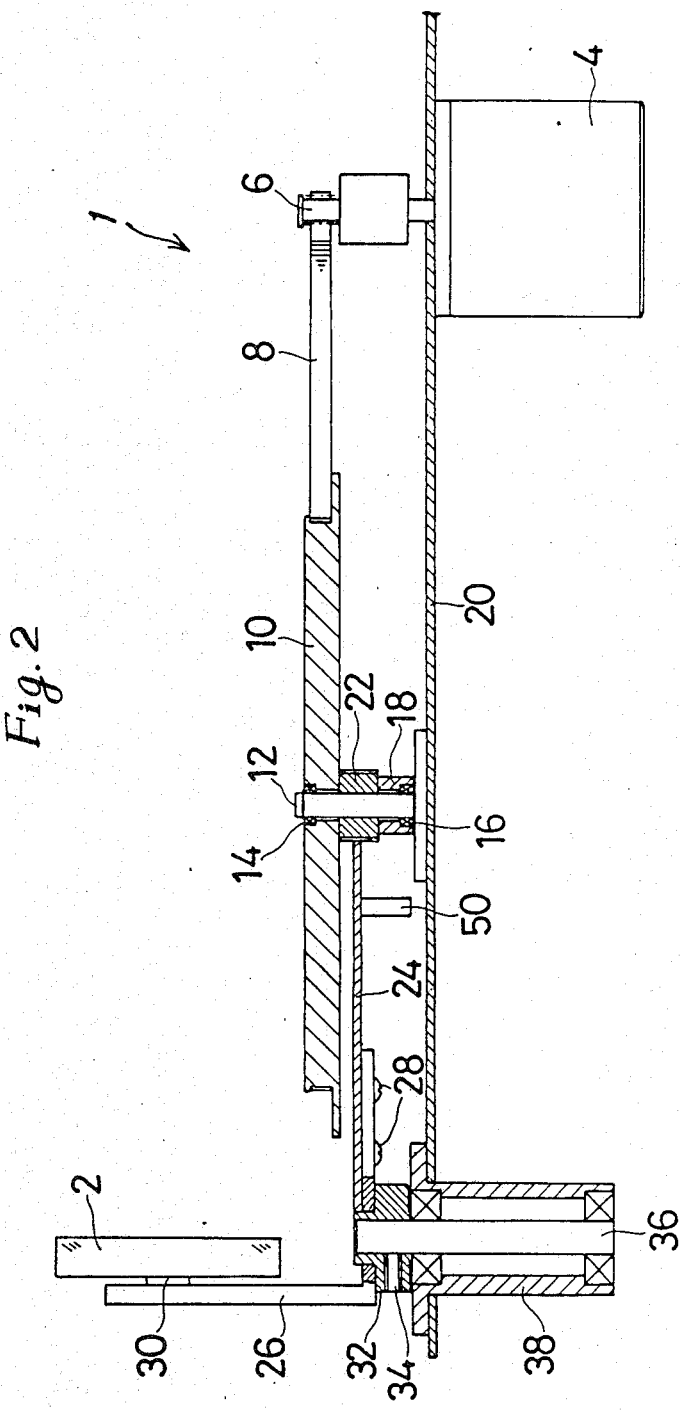

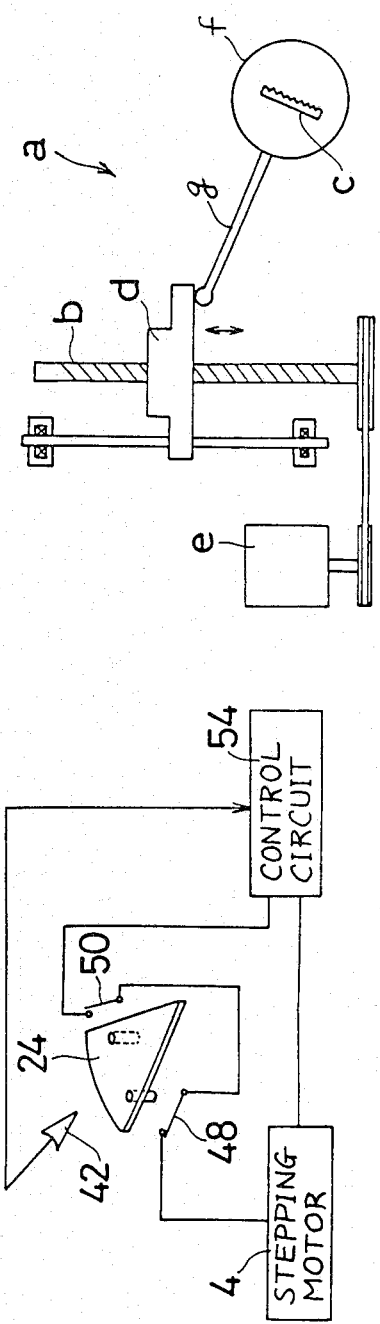

WAVELENGTH DRIVING DEVICE FOR MONOCHROMATORS

BACKGROUND OF THE INVENTION

This invention relates to a wavelength driving divice for monochromators.

There are known two types of wavelength driving devices, that is, a sine bar type and a cam type. FIG. 4 schematically shows a wavelength driving device a of a sine bar type which comprises a shaft b having a threaded portion, a nut d engaging the threaded portion of the shaft so as to be moved axially thereof and a light dispersing element such as a diffraction grating c mounted on a plate f provided with an arm g engaging the nut d so that as the nut is moved, the plate f and the grating c thereon is turned for dispersion of the light incident thereon. In this device, the amount of displacement of the nut d is proportional to the wavelength of the light beam from the monochromator. Therefore, by rotating the shaft b to displace the nut d linearly it is possible to drive the wavelength linearly. However, since the precision or accuracy with which the shaft, the nut and other parts are machined directly influences the precision or accuracy of measurement, after the parts have been assembled, the device must be adjusted for accurate and precise operatin. Moreover, since the feeding shaft has a low efficiency of transmission of the driving force, in order to speed up wavelength driving the motor e must be a large-sized, expensive one capable of producing a large torque.

In the wavelength driving device of the cam type, the cams must be manufactured with a high degree of accuracy and precision with resulting increase in the manufacturing cost.

Accordingly, the primary object of the invention is to provide a wavelength driving device for use in monochromators, which eliminates the above-mentioned difficulties, and is simple in construction, capable of driving wavelength at high speed and yet low in the manufacturing cost.

SUMMARY OF THE INVENTION

Briefly stated, the wavelength driving device of the invention comprises an optical element for dispersing light into different wavelengths, means for supporting the optical element for rotation about a first axis, a stepping motor, a first toothed pulley of a relatively small diameter connected to the output shaft of the stepping motor for simultaneous stepwise rotation therewith, a first gear of a relatively large diameter fixed to the supporting means for simultaneous rotation about the first axis, a second gear of a relatively small diameter mounted for rotation about a second axis and meshing with the first gear, a second toothed pulley of a relatively large diameter fixed to the second gear for simultaneous rotation about the second axis, a toothed belt connecting the first and second toothed pulleys, and circuit means for controlling the rotation of the stepping motor.

The reduction ratio of the first gear to the second gear is set to such a value that the second toothed pulley is rotated for an angle smaller than 360° for scanning a wavelength range usually used for measurement.

The first gear preferably comprises a sector gear having a central angle larger than the angle of rotation required for the light dispersing element to scan the whole wavelength range to be scanned including light of the zeroth order.

BRIEF DESCRIPTION OF THE DRAWING

FIG. 1 is a top plan view of a wavelength driving device constructed in accordance with the invention;

FIG. 2 is a sectional view taken along line II—II in FIG. 1;

FIG. 3 is a diagram of a control circuit of the stepping motor in the device of FIG. 1; and FIG. 4 is a schematic top plan view of a conventional wavelength driving device.

PREFERRED EMBODIMENT OF THE INVENTION

Referring now to FIGS. 1 and 2, there is shown a wavelength driving device generally designated at 1 and provided with a five-phase stepping motor 4 for rotating a light dispersing element such as a concave diffraction grating 2. In the illustrated embodiment, the stepping motor 4 rotates for 0.72° per step, making one revolution by 500 steps, and is capable of driving at speeds higher than about 1000 pps.

A toothed pulley 6 of a small diameter is fixed to the output shaft of the stepping motor 4, and a toothed pulley 10 of a larger diameter is fixed to a shaft 12 mounted for rotation on a base 20 by means of bearings 14 and 16 and a collar 18.

A toothed timing belt 8 connects the two pulleys 6 and 10. The ratio of the number of the teeth on the small pulley 6 to that of the teeth on the larger pulley 10 is set to 1:21 in the illustrated embodiment.

A pinion gear 22 of a small diameter is fixed to the shaft 12 for simultaneous rotation with the large pulley 10. A sector gear 24 of a large diameter meshes with the pinion gear 22. The sector gear 24 has a central angle greater than the angle of rotation required for the grating 2 to scan the whole wavelength range including the light of the zeroth order. The sector gear 24 is fixed by screws 28 to a holder 26 on which the grating 2 is mounted by means of a fixing member 30.

Generally speaking, since the angle of rotation of a concave diffraction grating is between 20° and 45°, the sector gear 24 of the large diameter sufficiently has a central angle greater than the above-mentioned range of angle of rotation. Therefore, the gear 24 need not necessarily be a circular one but may advantageously be a sector gear for space utility as in the illustrated embodiment.

In the illustrated embodiment, the gear ratio of the small pinion gear 22 to the large sector gear 24 is 1:12. As previously mentioned, the gear ratio of the small toothed pulley 6 to the large toothed pulley 10 is 1:21, so that the rotation of the stepping motor 4 is transmitted to the grating 2 at a reduction ratio of $1/(12\times21)=1/252$. This means that one step of rotation of the stepping motor 4 corresponds to the rotational angle $0.72°\times1/252=0.0029°$ of the grating 2.

The concave grating 2 is fixed to the holder 26 by means of a fixing member 30. The holder 26 has a lower horizontal portion fixed to a boss 32, which is in turn fixed to a shaft 36 by a set screw 34. The shaft 36 is rotatably supported on the base 20 by a bearing 38, so that the holder 26 with the grating 2 mounted thereon and the sector gear 24 fixed thereto are simultaneously rotatable about the axis of the shaft 36.

The grating 2 is so arranged on the holder 26 that the line normal to the reflective surface of the grating 2 at the center of rotation thereof makes a predetermined angle with the central line of the sector gear 24, and the center of the reflective surface of the grating is coaxial with the axis of rotation of the holder 26 and that of the sector gear 24.

In the illustrated embodiment the whole wavelength range to be scanned including light of the zeroth order is set to a range of 0 to 1100 nm, and the wavelength range to be usually used for measurement is set to a range of 200 to 1100 nm. The angle of rotation of both the grating 2 and the sector gear 24 is set to about 33° for scanning the whole wavelength range and about 27° for scanning the wavelength range usually used for measurement. Since the gear ratio of the pinion gear 22 to the sector gear 24 is 1:12, the angle for which the large pulley 10 is rotated for scanning the whole wavelength range is 33°×12=396°, and the angle for which the same pulley 10 is rotated for scanning the wavelength range usually used is 27°×12=324°, which is smaller than 360°. Therefore, when used in the usual wavelength range of 200 to 1100 nm, each point on the periphery of the large toothed pulley 10 is in one to one correspondence with the dispersed wavelengths. The previously mentioned rotational angle 0.0029° of the grating 2 corresponding to one (1) step of the stepping motor 4 corresponds approximately to 0.1 nm in terms of wavelength. Therefore, scanning of wavelength in the usual range of 200–1100 nm can be covered by about 9000 steps of the stepping motor 4 and completed in as short a time as about 9 seconds when the motor 4 is rotated at a speed of 1000 pps.

In the illustrated embodiment, as the large pulley 10 is rotated in the direction of an arrow C and the sector gear 4 is simultaneously rotated in the direction of an arrow D, scanning proceeds from the shorter to the longer wavelength.

The large-diameter pulley 10 is provided on the periphery thereof with a slit 40. A photodetector 42 is supported by a holder 44 adjacent the periphery of the pulley 10 so that the photodetector 42 detects the slit 40 as the pulley 10 is rotated to bring the slit 40 to the photodetector 42. Adjacent the opposite lateral sides of the sector gear 24 there are arranged a pair of switches 46 and 48 so as to define the upper and lower limits of the range of rotation of the sector gear 24. The sector gear is provided on the under surface thereof with an upper limit pin 50 and a lower limit pin 52. As shown in FIG. 3, the photodetector 42 and the limit switches 46 and 48 are connected to a control circuit 54 which controls the rotation of the stepping motor 4. If the sector gear 24 should be rotated beyond the whole wavelength scanning range into the longer or shorter wavelength region, the upper or lower limit pin 50 or 52 abuts on the limit switch 46 or 48, which disconnects the motor 4 from a source of electricity not shown thereby to prevent overrunning.

The control circuit 54 controls the angle of rotation of the stepping motor 4 sinusoidally in such a manner that the concave diffraction grating 2 provides different wavelengths at equal intervals. The control circuit 54 stops the stepping motor 4 when the photodetector 42 has detected the slit 40.

The slit 40 defines a wavelength origin. The large pulley 10 is marked on the upper surface thereof with a first radial line A spaced a predetermined angle $\theta_1$ (greater than 360°) from the slit 40 and a second radial line B spaced a predetermined angle $\theta_2$ from the first radial line A. The first radial line A defines a reference position for adjustment of the optical axis of the monochromator in which the wavelength driving device is incorporated, and the second radial line B defines the initial point at which the two gears 22 and 24 come to mesh each other. The angle $\theta_1$ corresponds to the whole wavelength range from the zeroth-order light to 1100 nm to be scanned by the grating, that is, 396° in terms of the rotational angle of the pulley 10. The angle $\theta_2$ is set to twelve (12) times the angle $\alpha$ between one lateral side line of the sector gear 24 and a radial line connecting the center $0_1$ of rotation of the sector gear (coincident with the center of rotation of the grating 2) and the point at which the gears 22 and 24 mesh with each other when the grating 2 is so positioned with respect to the light coming through an entrance slit $S_1$ as to direct a light beam of the zeroth order through an exit slit $S_2$ as shown in FIG. 1.

For adjustment of the wavelength driving device 1, the large pulley 10 is positioned so that the second mark B thereon is aligned with the center of the photodetector 42 and at the same time the tooth at the left end of the sector gear 24 meshes with the pinion gear 22. Then as the pulley 10 is rotated in the direction indicated by the arrow C, both the sector gear 24 and the grating 2 are simultaneously rotated in the direction of the arrow D as far as the first mark A is aligned with the center of the photodetector 42, with the sector gear 24 having been rotated for the angle $\alpha$ and at the same time the pulley 10 having been rotated for the angle $\theta_2$, so that a light beam of the zeroth order emerges out of the exit slit $S_2$ of the monochromator. In practice, the gears 22 and 24 meshing with each other may cause a slight error, which can be eliminated by adjusting the holder 44 of the photodetector 42 to the left or right. Then, the pulley 10 is rotated for an angle greater than $\theta_1-390°$ and smaller than $\theta_1$ in the direction of the arrow C from the shorter to the longer wavelength regions as far as the slit 40 passes the photodetector 42, whereupon the pulley 10 is stopped for completion of the adjustment.

For self initialization of the monochromator, the stepping motor 4 is energized to rotate the pulley 10 in the direction of the arrow C as far as the slit 40 is detected by the photodetector 42 to stop the motor 4, whereupon a light beam having a wavelength of 1100 nm emerges out of the exit slit $S_2$. Thus, the position of the slit 40 gives a wavelength origin. In accordance with the invention, the optical axis can be adjusted correctly and easily by the first and second marks A and B.

To improve the precision and accuracy of detecting the wavelength origin, a method of detecting the energy peak of the light source may additionally be employed.

Generally speaking, in a mechanism for transmitting the rotation of a motor at a high reduction rate, an error in angular transmission becomes more influential at rear stages, where a higher degree of precision in mechanism is required, and since the component parts at fore stages are rotated at higher speeds, these parts at fore stages must be as noiseless as possible. In the illustrated wavelength driving device, the mechanism for transmitting rotation employs at the fore stage toothed pulleys and a toothed belt which require a lower degree of precision and produce little noise and at the rear stage the precision-made gears which are rotated at a lower speed, so that it is possible to effect noiseless transmission of rotation with a high degree of accuracy and precision.

The wavelength driving device constructed in accordance with the invention employs a toothed belt, toothed pulleys connected by the toothed belt and gears as a mechanism for rotating a light dispersing element, so that the whole structure is simplified with small errors in angular transmission. Since the mechanism has a high efficiency of transmission of the driving force, wavelength driving can be performed at a high speed with a stepping motor having a small output torque, with resulting reduction of the manufacturing cost.

What I claim is:

1. A wavelength driving device for use in monochromators, comprising:
   (a) an optical element for dispersing light into different wavelengths;
   (b) means for supporting said optical element for rotation about a first axis;
   (c) a stepping motor;
   (d) a first toothed pulley of a relatively small diameter connected to the output shaft of said stepping motor for simultaneous stepwise rotation therewith;
   (e) a first gear of a relatively large diameter fixed to said supporting means for simultaneous rotation about said first axis;
   (f) a second gear of a relatively small diameter mounted for rotation about a second axis and meshing with said first gear;
   (g) a second toothed pulley of a relatively large diameter fixed to said second gear for simultaneous rotation about said same second axis;
   (h) a toothed belt connecting said first and second toothed pulleys; and
   (i) circuit means for controlling the rotation of said stepping motor.

2. The device of claim 1, wherein the reduction ratio of said first gear to said second gear is set to such a value that said second toothed pulley is rotated for an angle smaller than 360° for scanning a wavelength range usually used for measurement.

3. The device of claim 1, wherein said first gear comprises a sector gear having a central angle larger than the angle of rotation of said light dispersing element to scan the whole wavelength range to be scanned including light of the zeroth order.

4. The device of claim 1, wherein said second toothed pulley is provided with means for defining a wavelength origin, a first mark spaced a predetermined angle $\theta_1$ from said wavelength origin for defining a reference position for adjustment of the optical axis, and a second mark spaced a predetermined angle $\theta_2$ from said first mark for defining the initial position at which said first and second gears mesh with each other.

5. The device of claim 4, wherein said wavelength origin defining means comprises a slit formed in the periphery of said second pulley and a photodetector disposed adjacent said periphery for detecting said slit, the position of said photodetector being adjustable circumferentially of said second pulley.

6. A monochromator comprising: and entrance slit; and exit slit; and a wavelength driving mechanism comprising a light dispersing element disposed in the optical path of a light beam passing through said entrance slit, means for supporting said light dispersing element rotatably about a first axis for dispersion of said light beam into different wavelengths to be directed to said exit slit, a stepping motor, a first toothed pulley of a relatively small diameter connected to the output shaft of said stepping motor for simultaneous stepwise rotation therewith, a first gear of a relatiavely large diameter fixed to said supporting means for simultaneous rotation about said first axis, a second gear of a relatively small diameter mounted for rotation about a second axis and meshing with said first gear, a second toothed pulley of a relatively large diameter fixed to said second gear for simultaneous rotation about said same second axis, a toothed belt connecting said first and second toothed pulleys, and circuit means for controlling the rotation of said stepping motor.

7. The apparatus of claim 6, wherein the reduction ratio of said first gear to said second gear is set to such a value that said second toothed pulley is rotated for an angle smaller than 360° for scanning a wavelength range usually used for measurement.

8. The apparatus of claim 6, wherein said first gear comprises a sector gear having a central angle larger than the angle of rotation of said light dispersing element to scan the whole wavelength range to be scanned including light of the zeroth order.

9. The apparatus of claim 6, wherein said second toothed pulley is provided with means for defining a wavelength origin, a first mark spaced a predetermined angle $\theta_1$ from said wavelength origin for defining a reference position for adjustment of the optical axis, and a second mark spaced a predetermined angle $\theta_2$ from said first mark for defining the initial position at which said first and second gears mesh with each other.

10. The apparatus of claim 9, wherein said wavelength origin defining means comprises a slit formed in the periphery of said second pulley and a photodetector disposed adjacent said periphery for detecting said slit, the position of said photodetector being adjustable circumferentially of said second pulley.

* * * * *